(12) United States Patent
Foster et al.

(10) Patent No.: US 9,153,109 B1
(45) Date of Patent: Oct. 6, 2015

(54) MOBILE DEVICE COVER WITH THEFT PROTECTION

(71) Applicant: Target Brands, Inc., Minneapolis, MN (US)

(72) Inventors: Robert F. Foster, Ramsey, MN (US); Lew Price, Burnsville, MN (US); Stacy L. Abel, Maple Grove, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 0 days.

(21) Appl. No.: 14/176,651

(22) Filed: Feb. 10, 2014

(51) Int. Cl.
| | |
|---|---|
| *G08B 21/00* | (2006.01) |
| *G08B 13/14* | (2006.01) |
| *G08B 13/22* | (2006.01) |
| *G06F 21/88* | (2013.01) |

(52) U.S. Cl.
CPC ............ *G08B 13/1463* (2013.01); *G06F 21/88* (2013.01); *G08B 13/14* (2013.01); *G08B 13/22* (2013.01)

(58) Field of Classification Search
CPC .............................. G08B 13/1463; G06F 21/88
See application file for complete search history.

(56) References Cited

U.S. PATENT DOCUMENTS

| | | | |
|---|---|---|---|
| 6,684,089 B1 | 1/2004 | Lee | |
| 7,546,671 B2 | 6/2009 | Finn | |
| 7,667,600 B2 * | 2/2010 | Woodbury et al. | 340/568.1 |
| D641,756 S | 7/2011 | Hsieh et al. | |
| D651,606 S | 1/2012 | Luijben | |
| D657,782 S | 4/2012 | Biller | |
| 8,214,913 B2 | 7/2012 | Chung et al. | |
| D665,810 S | 8/2012 | Jones et al. | |
| D668,661 S | 10/2012 | Norfolk | |
| 8,289,115 B2 | 10/2012 | Cretella, Jr. et al. | |
| D671,544 S | 11/2012 | Chun et al. | |
| D673,159 S | 12/2012 | McCarthy et al. | |
| D673,569 S | 1/2013 | Smith et al. | |
| D675,209 S | 1/2013 | Glanzer et al. | |
| 8,359,078 B2 | 1/2013 | Hung | |
| D675,624 S | 2/2013 | Wibby et al. | |
| 8,386,805 B2 * | 2/2013 | Little et al. | 713/193 |
| D686,626 S | 7/2013 | Tan | |
| 8,544,644 B2 | 10/2013 | Meehan | |
| 8,564,438 B2 * | 10/2013 | Fawcett et al. | 340/568.8 |
| 8,749,387 B2 * | 6/2014 | Fawcett et al. | 340/568.8 |
| 8,890,694 B2 * | 11/2014 | Yang | 340/572.8 |
| 2005/0130722 A1 * | 6/2005 | Eriksson et al. | 455/575.8 |
| 2008/0227507 A1 | 9/2008 | Joo | |
| 2010/0008028 A1 | 1/2010 | Richardson et al. | |
| 2010/0032332 A1 * | 2/2010 | Davis et al. | 206/459.1 |
| 2012/0235792 A1 | 9/2012 | Huang et al. | |
| 2013/0080762 A1 | 3/2013 | Cretella, Jr. et al. | |
| 2013/0141212 A1 * | 6/2013 | Pickering | 340/5.61 |
| 2013/0146661 A1 | 6/2013 | Melbrod et al. | |
| 2013/0206844 A1 | 8/2013 | Chen et al. | |
| 2013/0220841 A1 | 8/2013 | Yang | |
| 2013/0316690 A1 | 11/2013 | Wilder et al. | |

* cited by examiner

*Primary Examiner* — Van Trieu
(74) *Attorney, Agent, or Firm* — Merek, Blackmon & Voorhees, LLC

(57) ABSTRACT

A cover for a mobile device includes an engaging portion for engaging an exterior surface of the mobile device to secure the cover to the mobile device, a back protective panel for protecting a back surface of the mobile device and at least one wall extending from an interior side of the back protective panel and contacting the back surface of the mobile device. A theft-detection device capable of generating a signal in response to passing through a field is positioned on the interior side of the back protective panel such that a height of the theft-detection device is less than a height of the at least one wall.

15 Claims, 9 Drawing Sheets

MOBILE DEVICE COVER WITH THEFT PROTECTION

BACKGROUND

Electronic article surveillance (EAS) is a system used to detect when articles leave a designated area. These systems typically include a tag or marker that is attached to an article, such as a retail item for sale, a broadcasting antenna that broadcasts an interrogation signal and a receiving antenna that receives a response signal generated by the tag or marker in response to the interrogation signal.

In some EAS systems, the interrogation signal is generated at exits from the area and when a response signal is detected from a tag or marker, an alert is issued indicating that the article is moving toward an exit. In other embodiments, the tag on the article is periodically interrogated by the interrogation signal to ensure that the article remains within the area. When the article leaves the area, as indicated by the response signal not being received, an alert is generated.

Such EAS systems are used extensively in retail environments where retail items for sale have a tag or marker attached to them. Such tags or markers are typically disabled at a point-of-sale by either removing the tag from the item or applying a disabling signal that alters the tag or marker so that it no longer generates a response signal when it passes through the interrogation signal. This prevents purchased retail items from triggering an alarm as they are taken out of the store.

The discussion above is merely provided for general background information and is not intended to be used as an aid in determining the scope of the claimed subject matter. The claimed subject matter is not limited to implementations that solve any or all disadvantages noted in the background.

SUMMARY

A cover for a mobile device includes an engaging portion for engaging an exterior surface of the mobile device to secure the cover to the mobile device, a back protective panel for protecting a back surface of the mobile device and at least one wall extending from an interior side of the back protective panel and contacting the back surface of the mobile device. A theft-detection device capable of generating a signal in response to passing through a field is positioned on the interior side of the back protective panel such that a height of the theft-detection device is less than a height of the at least one wall.

An electronic article surveillance system includes a mobile device, a cover around a portion of the mobile device that protects the mobile device from being damaged while allowing the mobile device to be used and to be moved without restriction, an electronic article surveillance marker mounted to the cover, and a detection system that detects when the electronic article surveillance marker passes through an area. An alarm coupled to the detection system is activated by the detection system when the electronic article surveillance marker passes through the area.

A method involves generating an interrogation signal, and receiving a response signal from a mobile unit comprising a computing device, a cover and a tag, wherein the cover protects a back surface of the computing device while providing direct access to a display of the computing device, and the tag is positioned between the back surface of the computing device and the cover. The tag generates the response signal in response to the interrogation signal. An alert is then activated based on the received response signal to indicate that the mobile unit is leaving an area.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In retail settings, it is becoming more common for general-purpose computing devices to be issued to retail employees to assist them in performing tasks related to their work. These general-purpose computing devices include handheld devices such as smartphones and tablet devices. Because these devices can be used outside of the retail environment, they can become targets of theft especially in a retail store where the public is granted free access to the store. In addition, these general-purpose computing devices are prone to damage when used in a fast-pace retail environment.

The embodiments described below provide covers for mobile devices that protect the devices from damage and that trigger an alarm when the mobile devices are removed from a work area. As a result, these covers allow general-purpose mobile devices to be assigned to workers or employees while reducing the likelihood that the mobile device will be removed from the work area without authorization and reducing the likelihood that a device will be damaged. In one particular embodiment, the cover utilizes a theft-protection device that is similar to theft-protection devices used on retail items for sale in the work area. This reduces the overall cost of detecting theft of a worker-issued mobile device.

Figure 1:
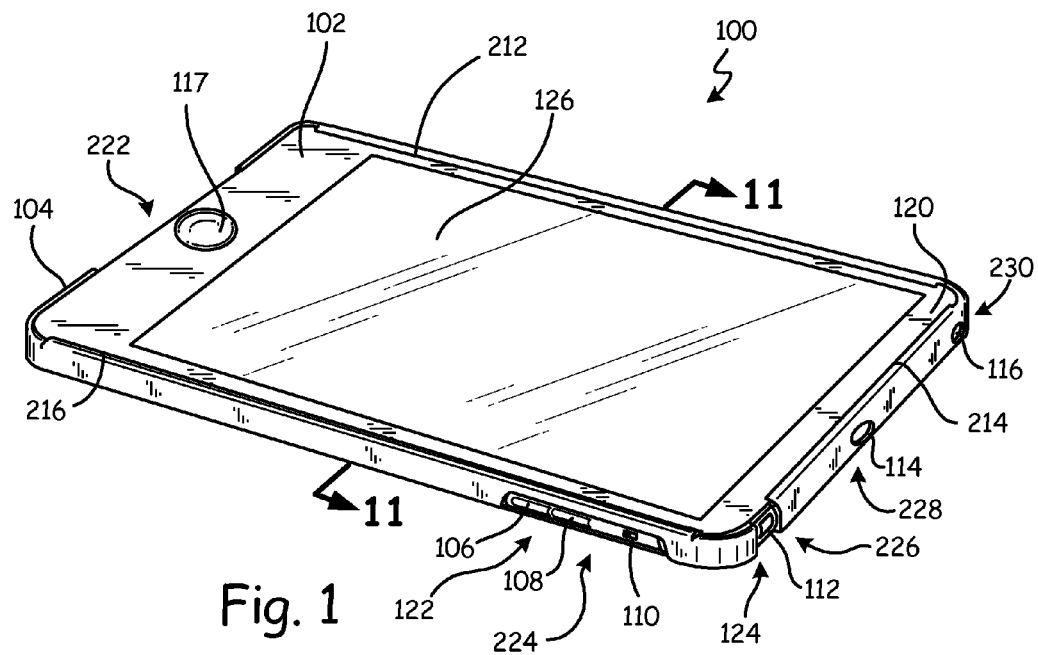
FIG. 1 is a perspective view of a mobile unit including a cover according to one embodiment.

FIG. 1 provides a perspective view of a mobile unit 100 that includes a mobile device or computing device 102 that is protected by a cover or case 104. Cover 104 protects mobile device 102 and allows mobile device 102 to be used in a normal manner and to be moved without restriction. Mobile device 102 may include a smartphone or a tablet computer, for example.

Mobile device 102 includes a front exterior surface 120 that includes a display 126 that in some embodiments is a touch-sensitive display that allows a user to interact with elements shown on display 126. Mobile device 102 also includes a collection of controls such as volume down control 106, volume up control 108, screen lock control 110, power control 112 and home control 117. In accordance with some embodiments, controls 106, 108, 112 and 117 take the form of a button and control 110 takes the form of a slidable switch. Mobile device 102 also includes a microphone jack 114 and a headphone jack 116. Another connection port for connecting the mobile device to other computing devices is provided on the bottom of mobile device 102 and is exposed by an opening 222 in cover 104. Volume down control 106, volume up control 108 and screen rotation lock 110 are shown on a first side 122 of mobile device 102. Power button 112, microphone jack 114 and headphone jack 116 are shown on a top side 124 of mobile device 102.

Cover 104 includes openings 222, 224, 226, 228 and 230, which provide access to the sides of mobile device 102 and in particular to the controls and connection ports located on the sides of mobile device 102.

Figure 7:
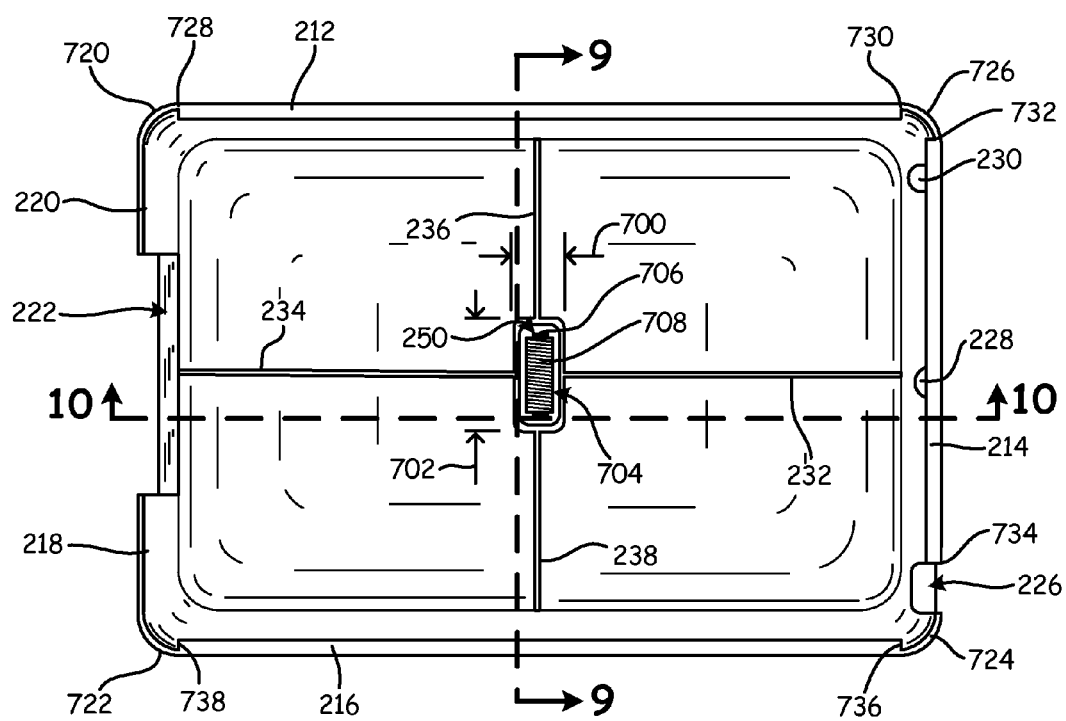
FIG. 7 is a front view of the cover of FIG. 2.
Figure 8:
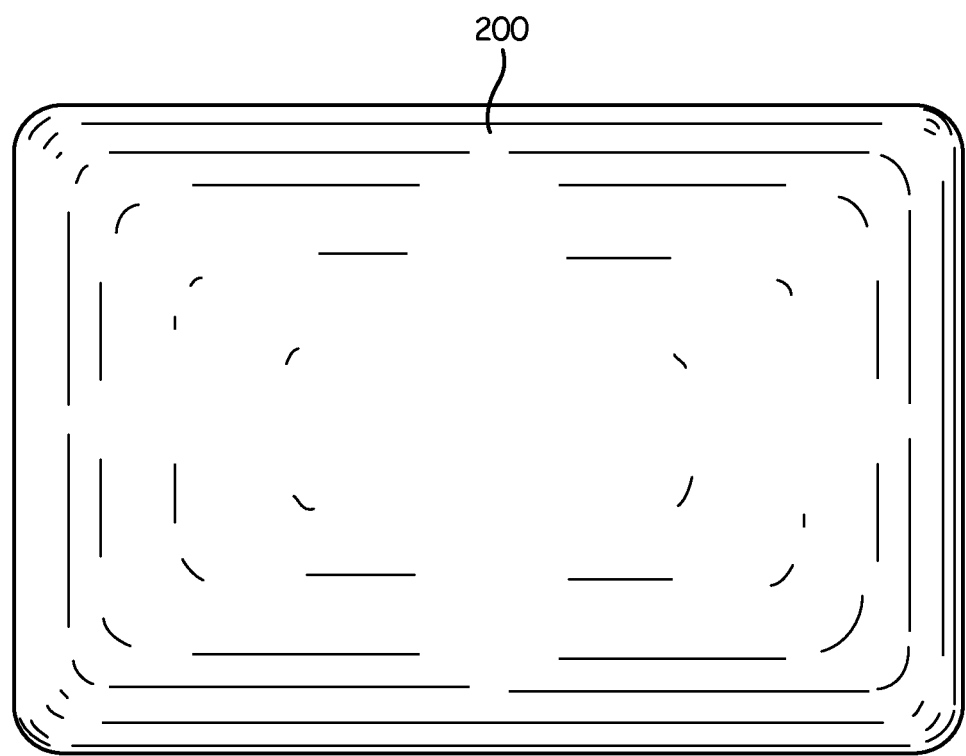
FIG. 8 is a back view of the cover of FIG. 2.

Three independent lips or edges 212, 214 and 216 provide engaging portions that engage front surface 120 of mobile device 102 to thereby secure cover 104 to mobile device 102. Lips 212, 214 and 216 are independent in the sense that they extend from respective sides of cover 104 but do not interact with other sides of cover 104 or with the other lips of cover 104. For example, as shown in FIG. 7, lip 212 extends from a first free end 728 to a second free end 730, lip 214 extends from a first free end 732 to a second free end 734, and lip 216 extends from a first free end 736 to a second free end 738. Ends 728, 730, 732, 734, 736 and 738 are separate from each other and end before corners 720, 722, 724, and 726 such that there is no lip present in corners 720, 722, 724 and 726. As a result, corner 726 separates lip 212 from lip 214 and corner 724 separates lip 214 from lip 216. Since lips 212, 214 and 216 do not extend over display 126, cover 104 provides the user with direct access to display 126 at all times. Thus, in the embodiment of FIG. 1, cover 104 does not cover display 126.

Figure 2:
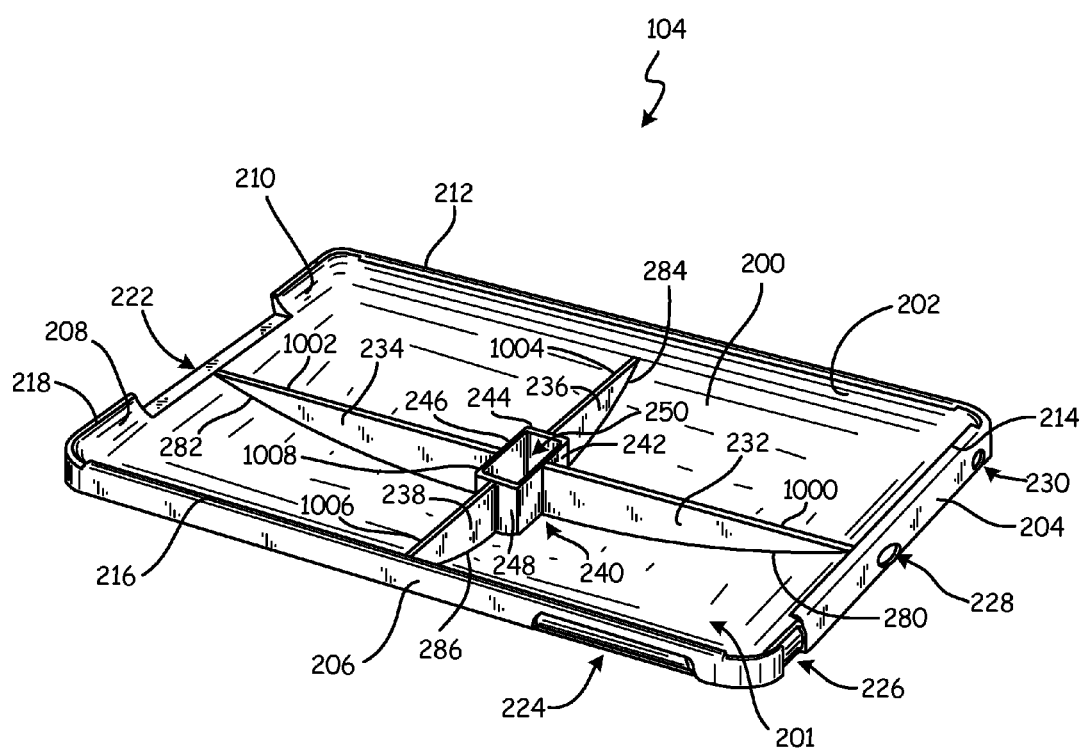
FIG. 2 is a perspective view of the cover illustrated in FIG. 1.
Figure 3:
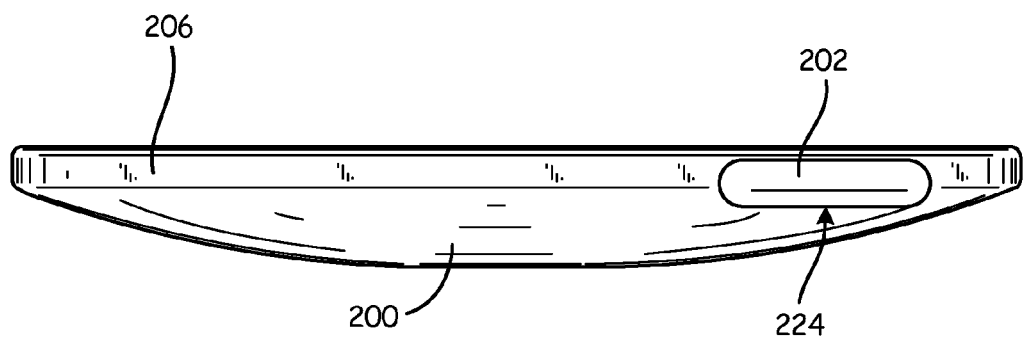
FIG. 3 is a right side view of the cover of FIG. 2.
Figure 4:
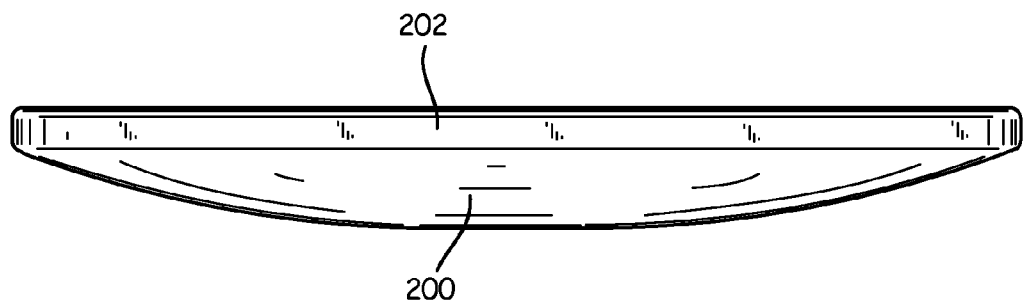
FIG. 4 is a left side view of the cover of FIG. 2.
Figure 5:
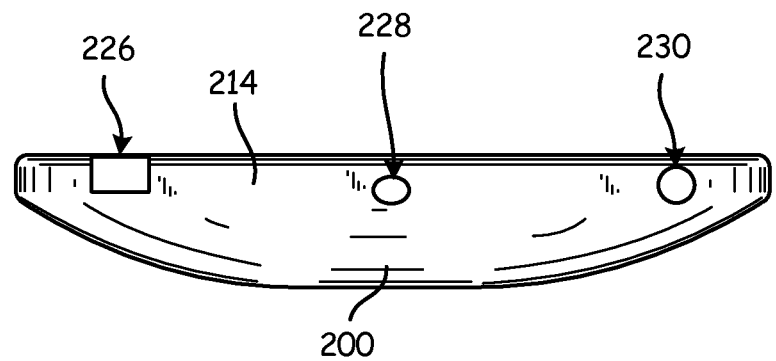
FIG. 5 is a top view of the cover of FIG. 2.
Figure 6:
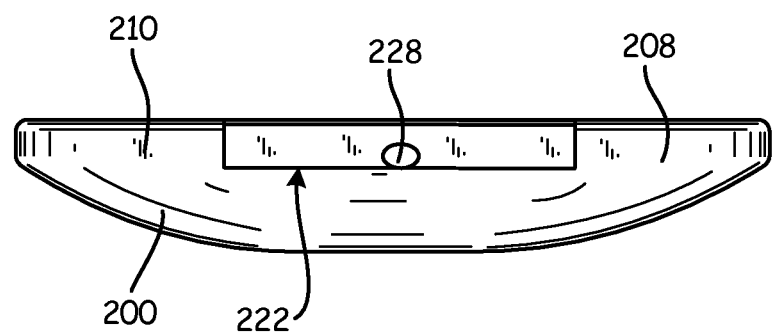
FIG. 6 is a bottom view of the cover of FIG. 2.
Figure 9:
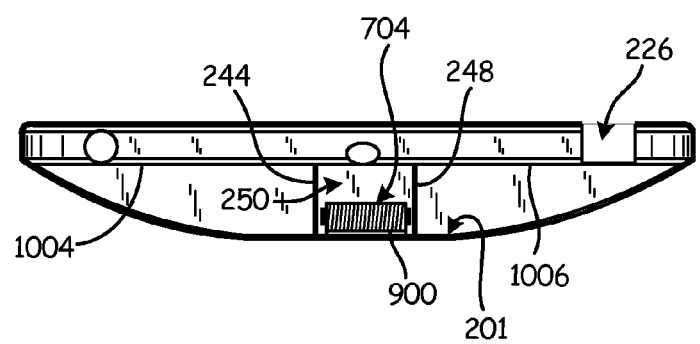
FIG. 9 is a sectional view of the cover of FIG. 2 taken through the line indicated in FIG. 7.
Figure 10:
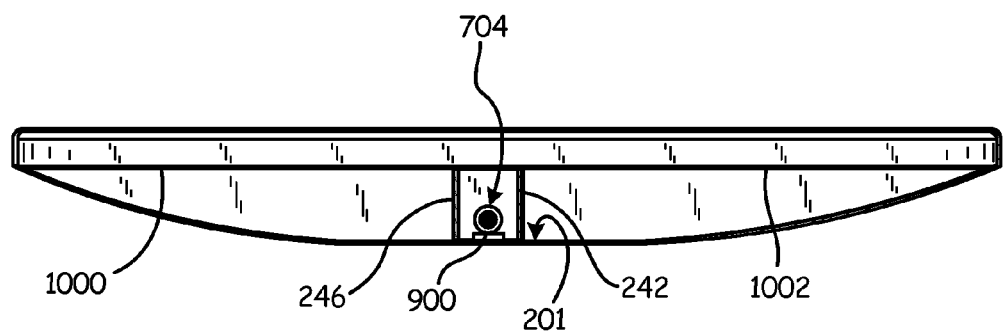
FIG. 10 is a second sectional view of the cover of FIG. 2 taken through the line indicated in FIG. 7.

FIG. 2 provides a perspective view of cover 104 without mobile device 102. FIGS. 3-8 provide a right side view, a left side view, a top view, a bottom view, and front view and a back view of cover 104 of FIG. 2. FIGS. 9 and 10 provide sectional views of cover 104 taken along lines shown in FIG. 7. Cover 104 includes sides 202 and 206, top 204 and bottom sections 208 and 210. In addition, cover 104 includes a back or back protective panel 200 that has an interior surface 201. Lip 212 extends from side 202, lip 214 extends from top 204 and lip 216 extends from side 206. Lips 212, 214 and 216 each extend toward a center of cover 104 from their respective sides and top. In accordance with one embodiment, bottom sections 208 and 210 do not include lips or edges such as lips 212, 214 and 216 to facilitate attaching cover 104 to mobile device 102. In particular, mobile device 102 may be slid into cover 104 by placing the top of mobile device 102 under lips 212 and 216 at bottom sections 208 and 210 and pushing mobile device toward top 204. In accordance with some embodiments, cover 104 is made from a plastic such as acrylonitrile butadiene styrene (ABS) and may be formed through injection molding or through 3-dimensional printing. The material used should be flexible enough to allow lips 212, 214 and 216 to flex slightly to allow mobile device 102 to be slid into cover 104, but not so flexible as to make it easy to remove mobile device 102 from cover 104.

A structure 240 comprised of raised walls 242, 244, 246 and 248 extends from interior side 201 of back 200 toward the front of cover 104 to thereby define a well or recess 250. Each of raised walls 242, 244, 246 and 248 has a free end 1008, which in one embodiment are all planar surfaces that are coplanar with each other. In such embodiments, the free end 1008 of raised walls 242, 244, 246 and 248 provides a contact surface for contacting a back of mobile device 102.

As shown in FIG. 7, a theft-detection device 704, also referred to as an electronic article surveillance marker, hardened marker, or tag is positioned within well 250 and is mounted to interior side 201 of cover 104. Structure 240 has a width 700 and a length 702 that are large enough to accommodate theft-detection device 704. Although structure 240 is shown as being positioned at the center of mobile device 102, structure 240 may be located at other positions along mobile device 102. In accordance with most embodiments, structure 240 and theft-detection device 704 are positioned relative to mobile device 102 to ensure that theft-detection device 704 is not next to an antenna in mobile device 102. This helps to reduce interference with mobile device communications when theft-detection device 704 generates a response signal. In accordance with one embodiment and as shown in FIGS. 9 and 10, theft-detection device 704 is mounted to interior side 201 of back 200 by a layer of epoxy or adhesive 900.

Cover 104 also includes ribs 232, 234, 236 and 238, which are alternatively referred to as walls or support walls. Each of ribs 232, 234, 236 and 238 includes a respective free end or free surface 1000, 1002, 1004 and 1006, which are alternatively referred to as substantially planar free ends. In accordance with one embodiment, substantially planar free ends 1000, 1002, 1004 and 1006 are coplanar with each other and coplanar with free end 1008 of structure 240. Free ends 1000, 1002, 1004, 1006 and 1008 are each designed to contact a back of mobile device 102 and thereby provide support for cover 104 relative to mobile device 102. Each rib 232, 234, 236 and 238 has a respective curved fixed end 280, 282, 284 and 286, which is fixed to interior side 201 of back 200.

Theft-detection device 704 in one embodiment is constructed of a conductor 708 wrapped around a ferrite core 706 as shown in FIG. 7. In other embodiments, theft-detection device 704 may take other forms such as an RFID antenna and circuitry. Theft-detection device 704 is powered by an externally applied interrogation signal, which causes theft-detection device 704 to generate a magnetic or electromagnetic signal in response. In embodiments that use a conductor 708 wrapped around a ferrite core 706, the interrogator signal produces a LC response due to the intrinsic capacitance and inductance of the conductor 708 wrapped around the ferrite core 706. In order to tune the harmonic response of the conductor and ferrite core, an additional capacitor may be added (not shown). In accordance with many embodiments, theft-detection device 704 is a hardened marker that is hardened against becoming inoperable due to the application of external magnetic fields or electromagnetic signals. Such hardened markers are different from typical markers found in retail environments, which are specifically designed to be disabled by the application of particular magnetic fields or electromagnetic signals to thereby allow consumers to leave with purchased items without triggering an alarm system. By using a hardened marker in cover 104, it is difficult to disable theft-detection device 704.

Figure 11:
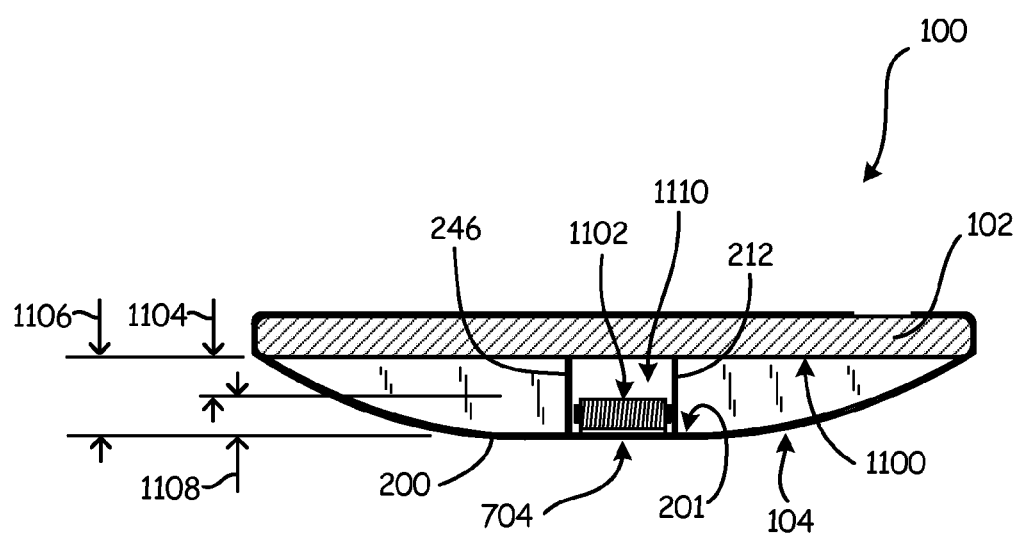
FIG. 11 is a sectional view of the mobile unit of FIG. 1 taken through the line indicated in FIG. 1.

FIG. 11 provides a sectional view of mobile unit 100 of FIG. 1 that is similar to the view of FIG. 9 but includes mobile device 102. As shown in FIG. 11, a back surface 1100 of mobile device 102 is positioned a height 1106 from interior side 201 of back 200. A top 1102 of theft-detection device 704 is located a height 1108 above interior side 201. Height 1108 is less than height 1106 resulting in a space 1110 between the top of theft-detection device 704 and back surface 1100. In particular, the top 1102 of theft-detection device 704 is separated from back surface 1100 of mobile device 102 by a distance 1104, which in accordance with one embodiment is at least 0.25 inches. Distance 1104 is provided so that the interrogating signal provided by the electronic article surveillance system is less likely to be shielded from theft-detection device 704 by mobile device 102 and to make it less likely that the response signal generated by theft-detection device 704 is shielded from the electronic article surveillance system by mobile device 102. In addition, distance 1104 reduces the likelihood that mobile device 102 will alter the LC response of theft-detection device 704. Without distance 1104, it is possible for mobile device 102 to interact with theft-detection device 704 such that one or more portions of mobile device 102 provide a parasitic inductance or parasitic capacitance that changes the overall inductance or capacitance of the theft-detection device. This would thereby change the harmonic response of the theft-detection device causing the response signal to be outside of the frequency band expected for the theft-detection device.

In accordance with further embodiments, a housing of mobile device 102 includes an inscription or permanently attached label indicating that mobile device 102 is the property of a business entity such as a retail store. This acts as an additional theft deterrence since it is often more difficult to resell mobile devices that have such inscriptions or labels. In embodiments where such an inscription or label is provided on the sides or back of mobile device 102, cover 104 is provided with an opening to expose the inscription or label. This allows the inscription or label to be seen without removing the cover and thus allows the inscription or label to act as a theft deterrent. For example, if the inscription is placed on the back of mobile device 102, an opening is provided in back 200 of cover 104 so that the inscription can be read without removing cover 104.

Figure 12:
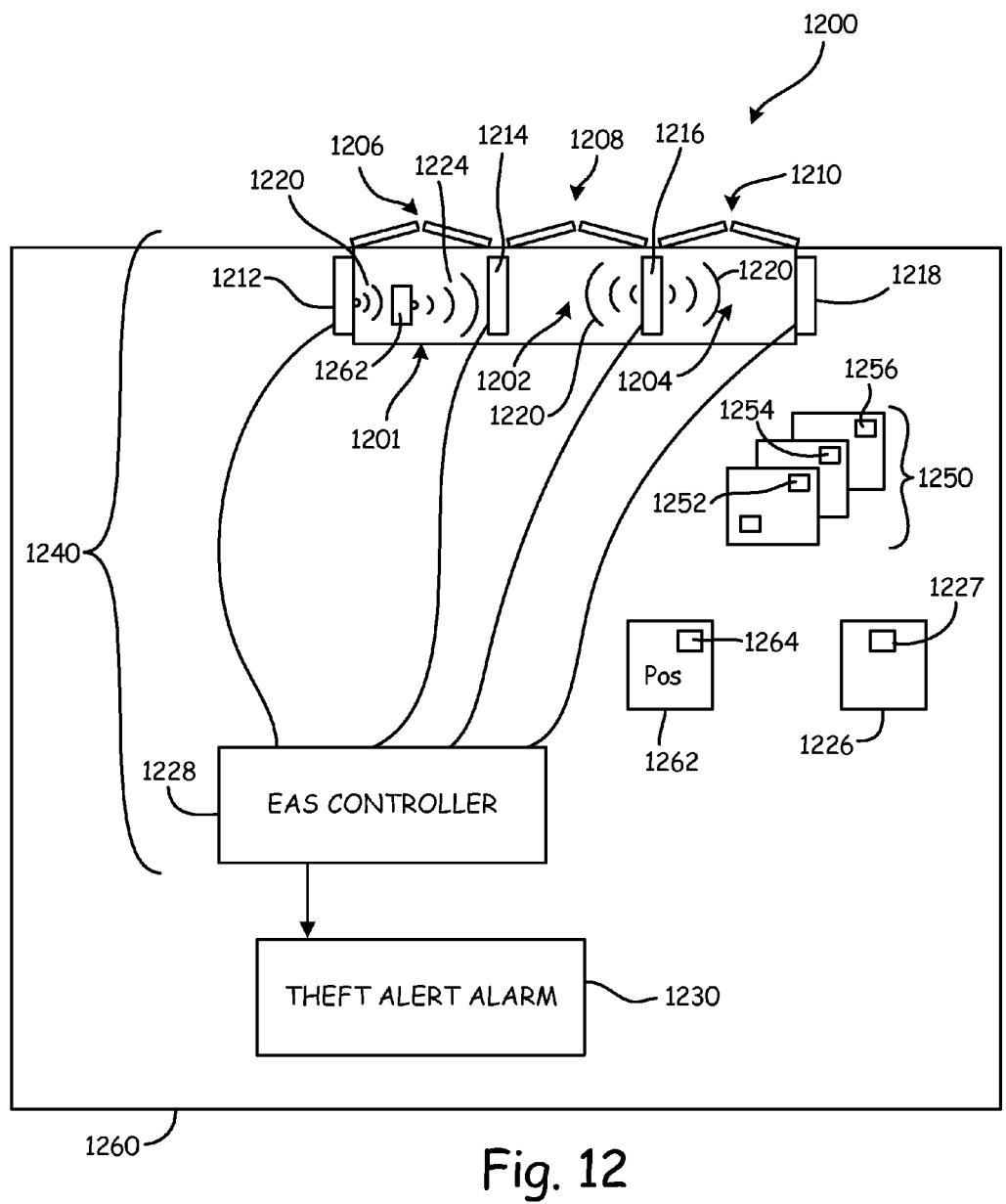
FIG. 12 is a schematic representative view of an electronic article surveillance system.

FIG. 12 provides a plan view of an electronic article surveillance system 1200. In accordance with one embodiment, electronic article surveillance system 1200 is designed to detect when items within a work area 1260, such as a building or retail establishment, leave work area 1260 by for example passing through an exit 1206, 1208 and 1210. Work area 1260 includes one or more non-retail items 1226 with embedded theft-detection devices 1227, such as mobile unit 100 described above. Such non-retail mobile devices are provided to workers or employees in work area 1260 and are not to be sold to consumers.

Work area 1260 can also include retail items 1250, which include electronic article surveillance markers 1252, 1254 and 1256. Retail items 1250 are designed to be purchased by a consumer at a point-of-sale register 1262. During the purchase of retail items 1250, a disabling device 1264 is used to disable the electronic article surveillance markers 1252, 1254 and 1256 so that the consumer may leave with the retail items through exits 1206, 1208 and 1210 without triggering a theft alert or alarm 1230. In accordance with some embodiments, theft-detection devices 1227 of non-retail items 1226 are hardened such that they cannot be disabled by disabling device 1264. As a result, theft-detection devices 1227 in non-retail items 1226 cannot be accidentally disabled while workers are using non-retail devices around point-of-sale register 1262.

For retail items 1250 that have not had their electronic article surveillance markers disabled and for non-retail items 1226 that include electronic article surveillance markers 1227, such as mobile unit 100 described above, electronic article surveillance system 1200 triggers theft alert/alarm 1230 when the articles pass into areas 1201, 1202 or 1204 proximate to exits 1206, 1208 and 1210. Theft alert/alarm 1230 is triggered by a detection system 1240 that includes an electronic article surveillance controller 1228 connected to transmitting antennae 1212 and 1216 and receiving antennae 1214 and 1218. Those skilled in the art will recognize that instead of using separate transmitter antennae and receiving antennae, one or more transceiver antennae may be used that both transmit an interrogation signal and receive a response signal. The design of the transmitter antenna should provide a strong field or signal within areas 1201, 1202 and 1204 but should dissipate quickly outside of areas 1202, 1202 and 1204.

EAS controller 1228 provides a signal to transmitter antennae 1212 and 1216 to cause each antenna to generate an interrogation signal 1220, which may take the form of a magnetic field or an electromagnetic field. The magnetic field may be static or may be fluctuating. In response to the interrogation signal 1220, a surveillance marker in an item 1266 in one of areas 1201, 1202 and 1204 generates a response signal 1224 that is detected by one or more of receiver antennae 1214 and 1218. The received signals are provided to EAS controller 1228, which determines if the response signal indicates that an item with an active electronic article surveillance marker has passed into one of areas 1201, 1202 and 1204. Such items can include retail items 1250 or a non-retail item 1226 such as mobile unit 100 described above. When EAS controller 1228 determines that the response signal indicates that an active electronic article surveillance marker is in one of areas 1201, 1202 or 1204, controller 1228 triggers theft alert 1230 to alert others. Theft alert 1230 may take the form of an audio signal or a visual signal either at exits 1206, 1208 and 1210 or a control room, which may be positioned within work area 1260 or at a site external to work area 1260. As depicted in FIG. 12, a same electronic article surveillance system 1200 can be used to prevent the unauthorized movement of both retail items 1250 and non-retail items 1226 from work area 1260.

In the embodiment of FIG. 12, the electronic article surveillance system 1200 detects that an item is leaving work area 1260 by detecting that the item has crossed into areas 1201, 1202 and 1204. In alternative embodiments, EAS controller 1228 monitors the location of items within work area 1260 by periodically sending interrogation signals throughout work area 1260. When EAS controller 1228 fails to receive a response from an item, either a retail item 1250 or a non-retail item 1226, EAS controller 1228 activates theft alert 1230 to indicate that an item has been removed from work area 1260.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:
1. A cover for a mobile device, the cover comprising:
an engaging portion for engaging an exterior surface of the mobile device to secure the cover to the mobile device;
a back protective panel for protecting a back surface of the mobile device;
at least one wall extending from an interior side of the back protective panel and having a free surface for contacting the back surface of the mobile device;
a theft-detection device capable of generating a signal in response to passing through a field, the theft-detection device positioned on the interior side of the back protec- tive panel such that a height of the theft-detection device is less than a height of the at least one wall;

wherein the at least one wall comprise walls that define a well adjacent the back surface of the mobile device and wherein the theft-detection device is positioned in the well between the back surface of the mobile device and an interior side of the back protective panel;

wherein the cover further includes a set of ribs extending from the walls that define the well to each side of the cover; and, wherein each rib has a substantially planar free end for contacting the mobile device and a curved fixed end that is fixed to interior side of the back panel.

2. The cover of claim 1 wherein the theft-detection device comprises a conductor wound around a ferrite core.

3. The cover of claim 1 wherein the engaging portion comprises a lip for engaging a front surface of the mobile device.

4. The cover of claim 3 wherein the engaging portion comprises multiple independent lips.

5. The cover of claim 4 wherein a side of the cover comprises an opening to permit access to a side of the mobile device.

6. An electronic article surveillance system comprising:
a mobile device,
a cover that covers a portion of the mobile device to protect the mobile device from being damaged while allowing the mobile device to be used and to be moved without restriction;
a hardened electronic article surveillance marker mounted to the cover;
a detection system that detects when the electronic article surveillance marker passes through an area; and
an alarm coupled to the detection system that is activated by the detection system when the electronic article surveillance marker passes through the area.

7. The electronic article surveillance system of claim 6 wherein the area comprises an area proximate an exit from a retail establishment containing retail items for sale and non-retail items for use by employees of the retail establishment and wherein the mobile device comprises a non-retail item.

8. The electronic article surveillance system of claim 7 wherein at least one retail item comprises a second electronic article surveillance marker and wherein the detection system activates the alarm when the second electronic article surveillance marker passes through the area.

9. The electronic article surveillance system of claim 6 wherein the electronic article surveillance marker is mounted to the cover such that there is a space between the electronic article surveillance marker and the mobile device.

10. The electronic article surveillance system of claim 9 wherein the electronic article surveillance marker is surrounded by a raised wall extending from a back panel of the cover to a back of the mobile device.

11. The electronic article surveillance system of claim 10 wherein the cover further comprises at least one support wall extending from a side of the cover to the raised wall surrounding the electronic article surveillance marker.

12. A method comprising:
providing a cover for a mobile computing device wherein the cover includes at least one wall extending from an interior side of the back protective panel and having a free surface for contacting the back surface of the mobile device;
inserting into the cover a theft-detection device capable of generating a signal in response to passing through a field, the theft-detection device positioned on the interior side of the back protective panel such that a height of the theft-detection device is less than a height of the at least one wall;
providing a well adjacent the back surface of the mobile device and wherein the theft-detection device is positioned in the well between the back surface of the mobile device and an interior side of the back protective panel;
providing a set of ribs extending from the walls that define the well to each side of the cover wherein each rib has a substantially planar free end for contacting the mobile device and a curved fixed end that is fixed to interior side of the back panel
generating an interrogation signal;
receiving a response signal from a mobile unit comprising a computing device, a cover and a tag wherein the cover protects a back surface of the computing device while providing direct access to a display of the computing device, and the tag is positioned between the back surface of the computing device and the cover, the tag generating the response signal in response to the interrogation signal; and
activating an alert to indicate that mobile unit is leaving an area based on the response signal.

13. The method of claim 12 comprising the step of assigning the mobile unit to a worker and the area is a work area.

14. The method of claim 12 further comprising generating a second interrogation signal, receiving a second response signal and activating a second alert to indicate that a retail item for sale in the area is leaving the area.

15. The method of claim 12 comprising the step of providing a plurality of edges extending over a front of the computing device and at least one opening for accessing a control on a side of the computing device.

\* \* \* \* \*